Figure 1:
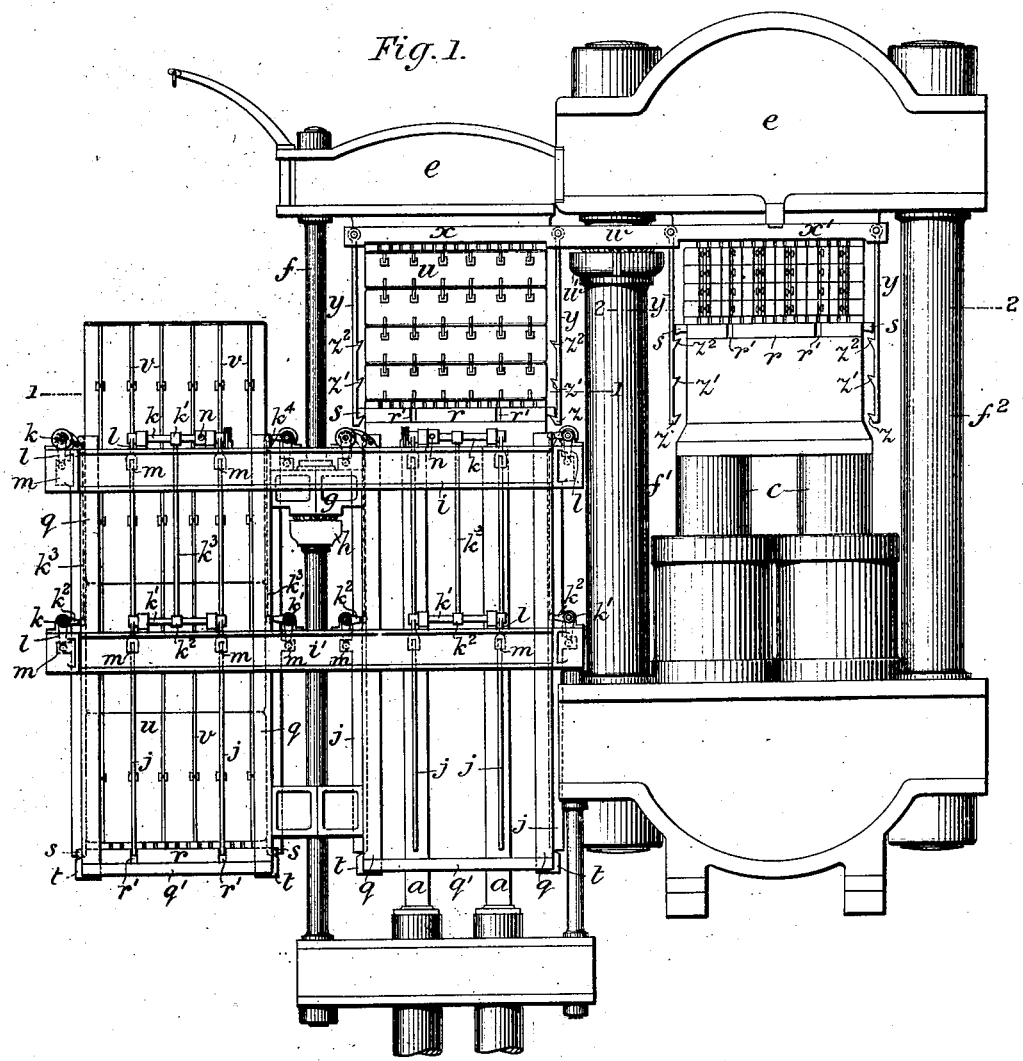

(No Model.)  2 Sheets—Sheet 1.

J. WATSON.
BALING PRESS.

No. 505,581.  Patented Sept. 26, 1893.

WITNESSES:
Fred White
C. K. Fraser.

INVENTOR:
James Watson,
By his Attorneys
Arthur C. Fraser & Co.

(No Model.) 2 Sheets—Sheet 2.
J. WATSON.
BALING PRESS.
No. 505,581. Patented Sept. 26, 1893.
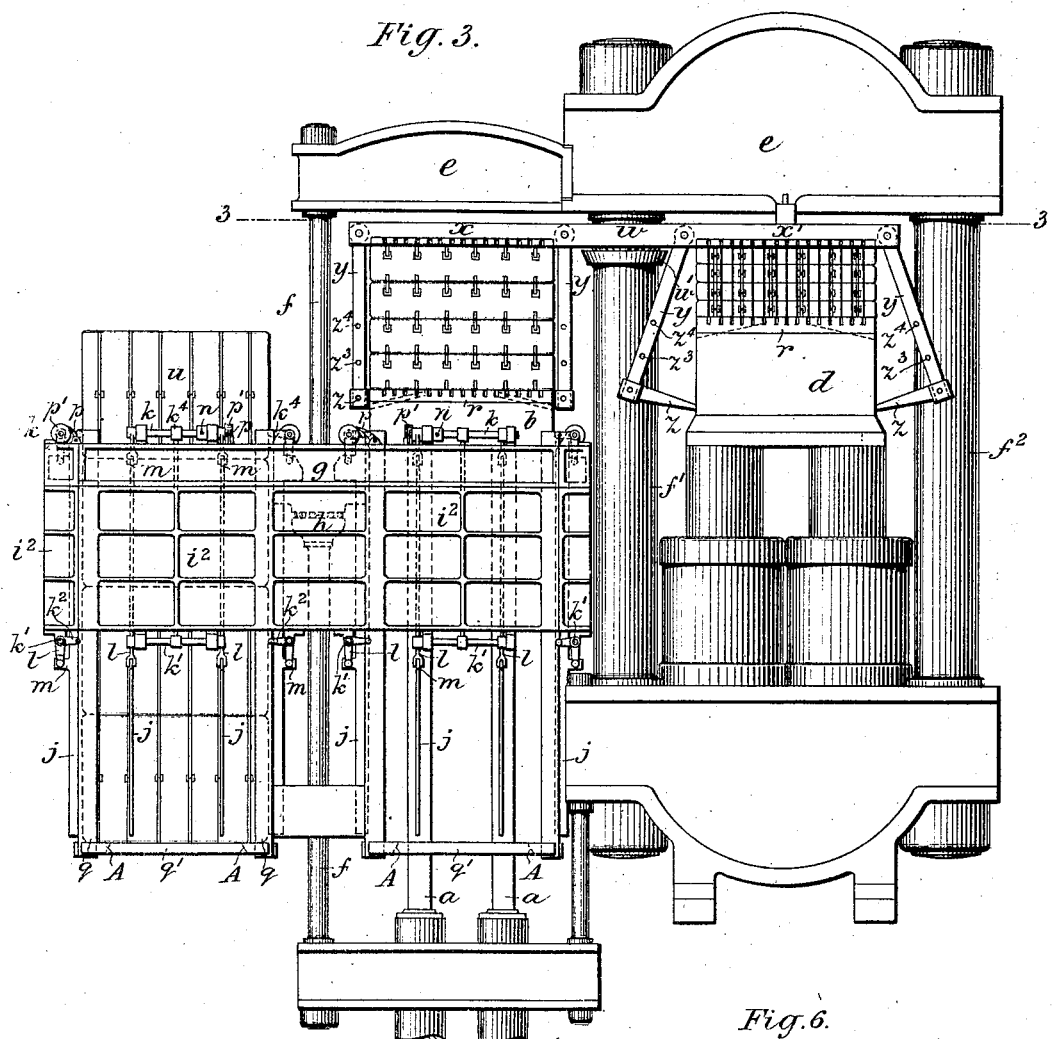
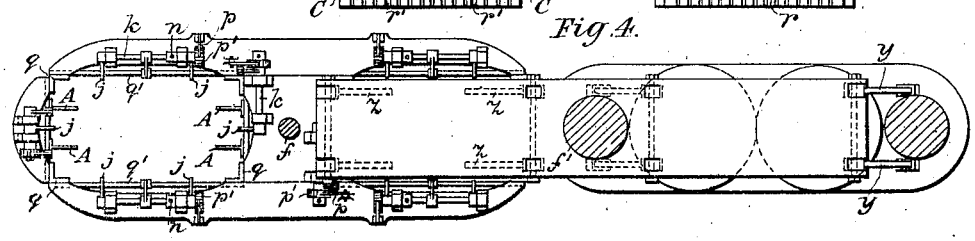
WITNESSES:
Fred White
C. K. Fraser.
INVENTOR:
James Watson,
By his Attorneys:
Arthur C. Fraser

UNITED STATES PATENT OFFICE.

JAMES WATSON, OF LONDON, ENGLAND.

BALING-PRESS.

SPECIFICATION forming part of Letters Patent No. 505,581, dated September 26, 1893.

Application filed February 9, 1893. Serial No. 461,578. (No model.)

*To all whom it may concern:*

Be it known that I, JAMES WATSON, of Pembridge Villas, Bayswater, London, England, have invented certain new and useful Improvements in Baling-Presses, of which the following is a specification.

My invention consists of improvements in baling presses and has been specially designed for the purpose of further compressing socalled "plantation" bales and enabling two or more of said bales to be compressed simultaneously and then bound or lashed together so as to form a compound bale.

The "plantation" bales ordinarily consist of partly compressed cotton covered with cloth or other covering and bound by hoops or other lashings each of which has a buckle or other fastening device at one side or the other of the bale; by the custom or requirements of the trade the bales must not be broken, that is to say the cotton must not be taken out of the original wrappers. The bales from one plantation differ in size from those from other plantations; the length may be considered as varying from fifty-six to sixty-six inches, the width from twenty-seven to thirty-six inches, and the depth from fortyfive to forty-eight inches.

My invention consists first of a deep cage capable of receiving two or more (preferably four) plantation bales superimposed or piled one above another, the said cage being open at top, and its sides and ends being adapted to move inward and outward within given limits so as to enable the internal sectional area of the cage to be adjusted to the length and width of the bales of the particular shipment or lot to be pressed. The said cage is either permanently placed over one or more hydraulic or other rams or, as is preferred, it is adapted to move first away from one or more rams to be filled with bales, and then returned over said rams in order that the bales may be compressed thereby. When the cage is adapted to move away from and then return over rams, preferably two or more similarly constructed deep cages are employed which can successively be filled, then moved over said rams, and after the bales have been forced out of the cage by the rams and the rams have again descended, moved away from the rams to be again filled; and when one or more cages are employed which can be moved away from the rams and again returned to position over same as just explained, it is preferred to mount said cages upon a column around which they can revolve so as to move to their successive positions, but instead of a revolving motion the cages may be moved to their successive positions by a rectilinear motion along suitable guides.

My invention further consists in combining with a cage the sectional area of which is adjustable as and for the purpose set forth a loose bottom lashing plate which has gaps or recesses at its sides and ends to allow of the vertical bars of the cage moving inward or outward while the adjustment is being effected and to enable the lashing plate to rise and fall in the cage in any position of said vertical bars.

My invention further consists in forming said loose bottom lashing plate with projections at the ends to engage with hooks as hereinafter described.

My invention further consists of a top lashing plate under the press head and carrying pendent bars on which one or more hooks are formed to engage with the projections already described on the bottom lashing plate or to engage with the under side of the pile of compressed bales when a loose bottom lashing plate is not employed.

My invention further consists in combining with said top lashing plate and its pendent hook bars another similar lashing plate with the like pendent hook bars, each of said plates being adapted to move from one to another of the same two presses for which purpose the said plates are preferably connected together and are adapted to rotate on a column preferably so that as the one top lashing plate moves from the first press to the second, the other top lashing plate moves from the second press to the first.

My invention comprises minor or subsidiary improvements the nature of which will be fully understood by the description hereinafter given.

In the preferred construction two presses of differential power are combined, the object being to first compress the superimposed bales by means of the press of less power, then to lock or hold the bales in the compressed state and transfer them to the press of greater power, then to further compress them by this press, and finally not only to lash or bind each bale separately by means of its original lashings or bindings, but also to lash or bind all the compressed bales together so as to form a compound bale. This process of compressing two or more plantation bales into a small compass and producing a compound bale, forms the subject of another application for patent of even date herewith, Serial No. 461,577.

Figure 2:
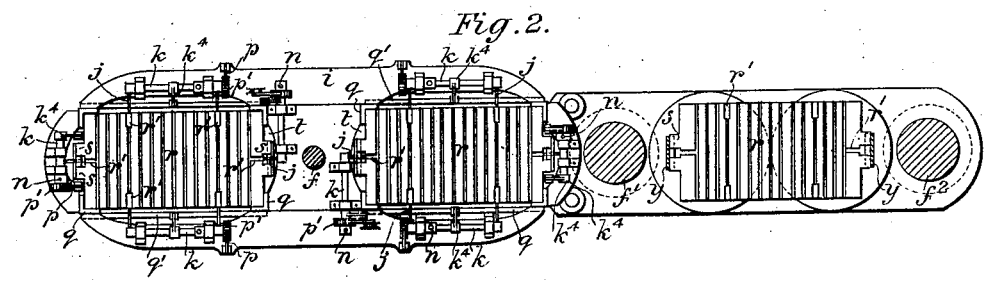

In the accompanying drawings:—Figure 1 is an elevation of a compound press constructed according to my invention in its preferred form. Fig. 2 is a horizontal section of the press partly on line 1—1 and partly on line 2—2 of Fig. 1, the bales being omitted. Fig. 3 is an elevation illustrating a modified construction in which the loose bottom lashing plate is dispensed with. Fig. 4 is a horizontal section on the line 3—3 of Fig. 3, the bales being omitted. Fig. 5 is a plan of the follower of the less power press in the arrangement shown in Fig. 3. Fig. 6 is a plan of the follower of the greater power press in the arrangement shown in Fig. 3.

In Figs. 1 and 3 two deep cages are shown, one of them being in the outside position and filled with four bales, the uppermost of which, however, enters the cage to only a small extent. The other cage is shown in the less power press, the rams of which are seen in their highest position, that is to say when they have forced the four bales and the bottom lashing plate out of the cage and compressed the bales against the top lashing plate. The same figures also show the rams of the greater power press in their highest position, that is to say, when they have still further compressed the bales against the top lashing plate.

Referring first to the compound press shown in Figs. 1 and 2, $a\ a$ are the rams and $b$ the follower of the less power press, and $c\ c$ the the rams and $d$ the follower of the greater power press.

$e\ e$ are the press heads supported by the columns $f\ f'\ f^2$.

$g$ is a bracket adapted to revolve upon a ball or other bearing $h$ on the column $f$. This bracket supports upper girders $i\ i$ which stretch across both of the cages and form binders of same.

$j\ j$ are vertical bars of which the cages are mainly composed; they are capable of being moved inwardly and outwardly for the purpose of regulating or adjusting the sectional area of the cages according to the length and width of the particular plantation bales to be treated. The number of these bars is variable, but I have shown each cage as having two bars at each side and one at each end, which I consider a suitable number. For the purpose of moving the bars $j\ j$ inward and outward any suitable mechanism can be employed, but the particular mechanism shown has been specially designed for the purpose. At each side and each end of the cage I mount in suitable bearings or brackets carried by the girders $i\ i$ a horizontal shaft $k$ and upon lower girders $i'\ i'$. I similarly mount other horizontal shafts $k'$ which I connect with upper shafts $k$ by means of arms or levers $k^2$ connecting rods $k^3$ and arms or levers $k^4$ so that any rotary motion given to one of the upper shafts $k$ is given to an equal extent to the corresponding lower shaft $k'$. Each shaft $k\ k'$ has as many arms or levers $l$ as there are vertical bars $j$ at its own side or end of the press, and these arms $l$ are connected by a pin joint to lugs $m$ on the vertical bars $j$. In each of the upper shafts $k$ is a hole $n$ (or a lever arm might be employed) to receive a turning bar not shown. When one of the shafts $k$ is turned by means of this bar in the one direction or the other the correspoding lower shaft $k'$ is likewise turned and the vertical bars $j\ j$ at that side or end of the cage are consequently moved inward or outward as the case may be. Return movement is prevented by the pawls $p$ engaging with the ratchet wheels $p'$ on the shafts $k$. The lower girders $i'\ i'$ are chiefly supported from the upper girders $i\ i$ by means of the vertical angle iron bars $q\ q$ which are fixed to both the upper and lower girders and extend to the bottom of the cage where they are braced by the horizontal bars $q'$.

$r\ r\ r$ are the loose bottom lashing plates of which there are three, one being seen at the bottom of the cage containing the compressed plantation bales, the second below the bales which have been compressed by the less power press, and the third below the bales which have been compressed by the greater power press. Each of the plates $r$ has gaps or recesses $r'\ r'$ at its sides and ends to allow of the movement of the bars $j\ j$, and it also has projections $s\ s$ at the ends to engage with the hook bars hereinafter described. When one of the plates $r$ is at the bottom of one of the cages it is supported by the cross pieces $t\ t$ at the cage bottom upon which pieces the projections $s\ s$ of the plate rest.

$u\ u$ Fig. 1, represent the plantation bales with their original bindings or hoops $v\ v$.

$w$ is a bearing adapted to revolve upon a ball or other bearing $w'$ on the column $f'$. The bearing $w$ forms the middle portion of two top lashing plates $x\ x'$ which revolve with said bearing and are so arranged relatively to each other and to the two presses that when the plate $x$ is in position over the follower $b$ of the less power press the plate $x'$ is in position over the follower $d$, of the greater power press and vice versa. From both ends of each of the two plates $x\ x'$ hang hinged bars $y\ y$ having hooks $z$ at their lower ends to engage with the projections $s\ s$ on the bottom lashing plate $r$ after this plate has been thrust up by the rams $a\ a$. The hinged bars $y\ y$ have by preference other hooks $z'$ and $z^2$ at higher levels which are intended respectively to engage with the projections $s\ s$ of the lashing plate $r$ if at the end of a shipment or for other reason only three or two bales are put into the cage instead of the normal number four.

The operation of pressing a cage load of four plantation bales is as follows: The cages having been adjusted by means of the vertical adjusting bars $jj$ to the length and width of the bales of the particular shipment or lot to be pressed the outside cage receives its charge or load of four bales $u\,u$. The girders $i\,i$ are then swung round on the bracket $g$ to bring this cage over the rams $a\,a$ (which are then in their lowest position) while the other cage which was over said rams takes up the outside position ready to receive its charge. The rams $a\,a$ are then caused to rise so that their follower $b$ forces up the bottom lashing plate $r$ and bales $u\,u$ against the top lashing plate $x$ until the plate $r$ is clear of the cage and is caught by the engagement of the hooks $z$ with the projections $s\,s$ on the ends of the cage, these hooks having been previously pushed back out of the way by the projections $s\,s$ while rising acting against the beveled or inclined portions shown on said hooks. Owing to the reduction thus given to the depth of each of the four bales a considerable portion of their hoops $v\,v$ will now bulge or project at both sides. A large part of this portion should now be cut away, fresh loops be formed on the ends of the remaining parts at both sides and buckles placed thereon. The two top lashing plates $x\,x'$ are next swung round on the ball bearing $w'$ so as to bring the plate $x$ with the four bales and bottom lashing plate $r$ held by the hooks $z$ in line with the rams $c\,c$. These are then caused to rise so as to give the final pressure to the bales against the lashing plate $r$. While these rams are still up the bales should all be bound separately by means of their original hoops $v$ and then the whole should be lashed together, thereby becoming a compound bale. The rams $c\,c$ are then lowered and the lashing plate $r$ which together with the finished compound bale descends with them until caught by the hooks $z^3$ or by the hooks $z$ when the hooks $z^3$ and $z'$ are not employed. The finished bale and lashing plate $r$ remain held by the hooks until the upper plate $x$ and hook bars are again swung round over the rams $a\,a$. The finished bale is then pushed out and the rams $a\,a$ are allowed to rise a little to lift the plate $r$ clear of the hooks. The hooks are then moved back and the rams $a\,a$ allowed to fall, the plate $r$ descending with them until it rests by its projections $s\,s$ on the cross pieces $t\,t$ of the cage, which for the time being is in line with these rams. This cage with the lashing plates is then swung round to the outside position for the cage to again receive a charge of plantation bales.

Referring now to the modification represented in Figs. 3 to 6, instead of the bottom lashing plates $r\,r$ being loose as in the modification represented in Figs. 1 and 2 they are fixtures on the top of the followers $b$ and $d$ of the two presses. The cages have stops or holders A A at bottom on which the bales rest when put into the cage, and the hooks $z$ which serve to hold up the bales after they have been compressed by the rams $a\,a$ are made long, so as to go sufficiently far for the purpose under the bales. These hooks are held back by hand or otherwise until the bales have been pushed past them, and they are then inserted under the bales. The hooks $z$ can be detached from the bars $y\,y$ and secured in either the holes $z^3$ or $z^4$ in said bars when three or two bales as the case may be are being pressed instead of four bales. The follower $b$ and the lashing plate $r$ fixed on top of same have gaps or recesses B B to enable them to clear the stops A A on the cage, and they have also grooves or recesses C C to allow the hooks $z$ to pass under the bales. The follower $d$ and the lashing plate $r$ fixed on top of same have similar grooves or recesses D D to allow them to clear the said hooks and lift the bales clear of their grip after which the hooks are withdrawn as said follower continues its rise. The upper girders $i\,i$ and lower girders $i'\,i'$ are shown as connected by a sort of casing or wall $i^2$.

Although I have described and shown the press as constructed for effecting the pressure in a vertical direction upward, which is the preferred arrangement, it is obvious that it may be constructed to effect the pressure in a vertical direction downward, or one of the presses may work upward and the other downward, or the presses may work in a horizontal direction; in the last case the adjustable bars $jj$ of the cages would of course be horizontal.

What I claim, and desire to secure by Letters Patent, is—

1. In a baling press, a rectangular cage, receiving the bale to be compressed, and a plate movable through said cage longitudinally thereof to compress the bale therein, said cage having opposite parallel movable sides each consisting of a plurality of longitudinal bars, said opposite side bars movable inward and outward equally to adjust the internal sectional area of said cage, whereby the internal sectional area of said cage and a connection between said sides, said connection engaging and moving each side equally, can be diminished or increased equally at its sides at will, substantially as and for the purpose set forth.

2. In a baling press, a rectangular cage, receiving the bale to be compressed, and a plate movable through said cage longitudinally thereof to compress the bale therein, said cage having opposite side and end walls consisting of longitudinal bars at the sides and ends of said cage, said opposite side bars movable inward and outward equally, and said opposite end bars movable inward and outward equally, to adjust the internal sectional area of said cage, whereby the internal sectional area of said cage can be diminished or increased equally at its ends and sides at will, substantially as and for the purpose set forth.

3. In a cage for receiving bales to be compressed in a baling press, this combination with the longitudinal bars $j\ j$ at the sides and ends of said cage movable inward and outward for the purpose of adjusting the internal sectional area of the cage, of the upper and lower girders $i$ and $i'$ carrying said cage and supporting said bars $j\ j$, vertical bars $q$ fixed to said girders and in part supporting the lower from the upper girders, and horizontal bars $q'$ connecting said vertical bars together for bracing their ends, substantially as described and shown.

4. In a cage for receiving bales to be compressed in a baling press, the combination with the longitudinal bars $j\ j$ at the sides and ends of said cage, and with the upper and lower girders $i$ and $i'$ which carry said cage, of the horizontal shaft $k$ adapted to turn axially in bearings on said upper girder, horizontal shafts $k'$ adapted to turn axially in bearings on said lower girder, connections between the horizontal shaft $k$, and the horizontal shafts $k'$ adapted to transmit any axial motion of any of said shafts $k'$ to an equal extent to the corresponding shafts $k$, and arms $l\ l$ on said shafts $k$ and $k'$ connected to said longitudinal bars $j\ j$, whereby by imparting axial motion to said shafts $k$ the said bars $j\ j$ can be moved inward or outward, and the internal sectional area of said cage be thereby diminished or increased, substantially as set forth.

5. In a baling press, the combination with a pivotal vertical column, of two rectangular cages successively receiving bales to be compressed, a plate at one side of said column movable vertically through said cages successively, and horizontal girders supporting said cages, pivotally carried by said column, and swinging therearound to bring said cages successively over said plate, each of said cages having opposite parallel sides movable to an equal extent, and while retaining their parallelism, toward and from the center of their cage to vary its internal sectional area to fit bales of different sizes, whereby in their adjustment said sides vary the area of the cage equally relatively to its center, whereby said cages can be brought in turn first to an outside position to receive a charge, and there adjusted to fit the charge, and then into line with said plate to enable said charge to be compressed thereby, and when over said plate the adjusted sides of the cage will be equally disposed relatively to the line of movement of the plate, substantially as and for the purpose set forth.

6. In a baling press, the combination with longitudinal bars constituting part of the sides and ends of a cage for receiving bales to be compressed and adapted to move inward and outward to diminish or increase the internal sectional area of said cage, of a bottom lashing plate having gaps or recesses at its edges, whereby said movement of the longitudinal bars is permitted and said lashing plate is enabled to rise and fall in said cage in any position of said bars, substantially as set forth.

7. In a baling press, a pendent bar hinged at top to the end of a top lashing plate and having a hook at the lower end holding up the compressed bales when the normal number has been compressed, and having a second hook at an intermediate part of its length, said second hook holding up the compressed bales after the pressing operation in the case where less than the normal number of bales has been compressed.

8. In a compound baling press, comprising a press of less power and a press of greater power, the combination with two top lashing plates and a bearing piece connecting together and supporting said two lashing plates and movable in a horizontal plane around a column, whereby the said lashing plates can be brought in turn first into line with the rams of the less power press to allow the first compression to be given to the bales, and then, together with said bales, into line with the rams of the greater power press to allow the final compression to be given to said bales, of pendent bars hinged to the ends of each of said top lashing plates and having hooks holding up the bales after they have been compressed by the press of less power and while moving to the other press, substantially as set forth.

9. In a baling press, the combination substantially, as hereinbefore described, and shown, of two cages receiving bales to be compressed, said cages being adjustable to vary their internal sectional area, being movable in turn first to an outside position to receive a charge, and then into line with the rams of a press, the said press, a second press of greater power, and two top lashing plates movable in turn first into line with the rams of the first press to allow the first compression to be given to the bales, and then together with said bales into line with the rams of said second press to allow the final compression to be given to the bales, and pendent hooked bars hinged to the ends of said lashing plates and having hooks, and holding up, the bales after they have been compressed by said first press, and while moving with said top lashing plates to said second press, substantially as and for the purpose hereinbefore set forth.

In testimony whereof I have hereunto signed my name in the presence of two subscribing witnesses.

JAMES WATSON.

Witnesses:
JOHN C. MEWBURN,
THOMAS L. WHITEHEAD.